United States Patent [19]

Wilkinson

[11] Patent Number: 4,573,691
[45] Date of Patent: Mar. 4, 1986

[54] MECHANICAL FACE SEALS

[75] Inventor: Samuel C. W. Wilkinson, Chidham, England

[73] Assignee: Crane Packing Limited, Slough, England

[21] Appl. No.: 669,950

[22] Filed: Nov. 9, 1984

[30] Foreign Application Priority Data

Nov. 12, 1983 [GB] United Kingdom ............... 8330256

[51] Int. Cl.⁴ ............................................. F16J 15/34
[52] U.S. Cl. .................................................. 277/96.1
[58] Field of Search ................. 277/81 R, 96 R, 96.1, 277/27

[56] References Cited

U.S. PATENT DOCUMENTS 3,147,013  9/1964  Tracy ................................. 277/96.1
4,406,466  9/1983  Ceary ................................. 277/96.1
4,461,487  7/1984  Matsumoto ........................ 277/96.1
4,523,764  6/1985  Albers et al. ......................... 277/27

Primary Examiner—Robert I. Smith
Attorney, Agent, or Firm—Kemon & Estabrook

[57] ABSTRACT

In a mechanical face seal for producing a fluid tight seal between a pair of relatively rotatable components a first sealing element is associated with one of said components and is fixed axially with respect thereto; a second sealing element is associated with the other component and is movable axially with respect thereto; means is provided for sealing the second sealing element with respect to its associated component and loading it axially into sealing engagement with the first sealing element and a thrust bearing is provided between the sealing element to partially reduce the load applied thereto.

10 Claims, 4 Drawing Figures

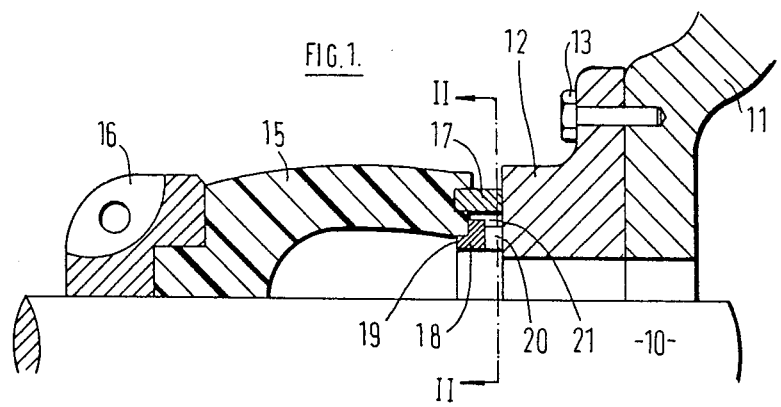
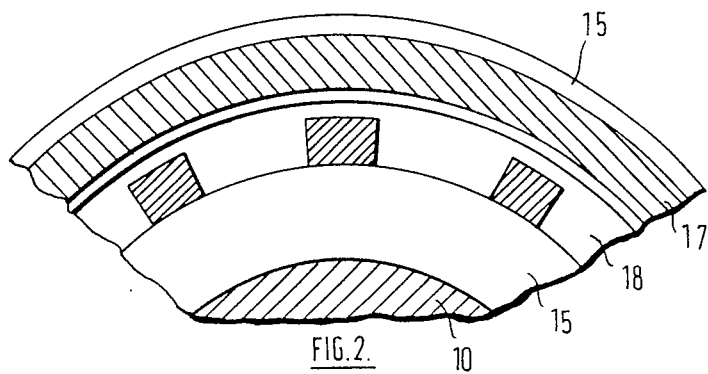

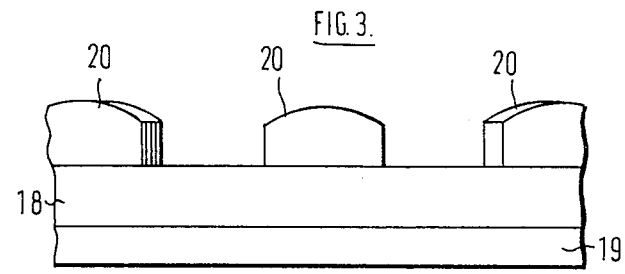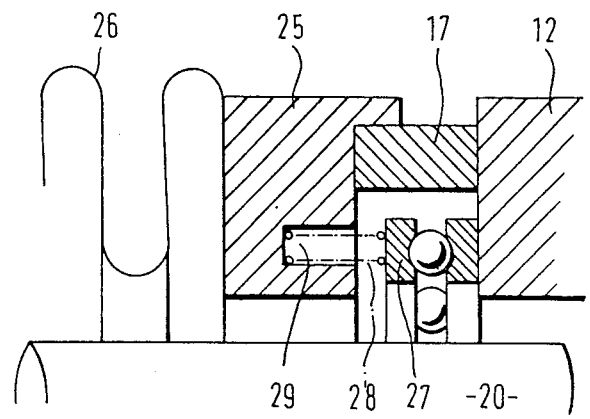

MECHANICAL FACE SEALS

This invention relates to mechanical face seals.

Mechanical face seals are used to provide a seal between relatively rotatable components such as a shaft and housing. One sealing element, the seat, is mounted on one component so that it is axially fixed with respect to the component. A second sealing element, the seal face member, is mounted on the other component, so that it is movable axially thereof, and is urged towards the seat, so that opposed surfaces of the seat and seal face member engage one another in fluid tight manner.

To enable the seal face member to move axially with respect to its associated component, a secondary sealing means is required between the seal face member and its associated component. Spring means is also required to apply the axial load to the seal face member to urge it into sealing engagement with the seat.

The effectiveness of this form of seal relies on a very finely controlled balance between the load applied to the sealing faces and the extent to which that load can be supported by a lubricating fluid film which is formed between the sealing faces. If the load is too large, the seat and seal face member will be subjected to rapid wear and if it is too small, the seal will leak.

The secondary sealing and axial loading functions may be achieved by independent means. For example, the secondary sealing means may be in the form of an elastomeric 'O' ring or a sealing wedge which is interposed between the seal face member and its associated component and moves with the seal face member. Alternatively, the secondary sealing means may be provided by a flexible diaphragm or bellows unit which is connected between the seal face member and its associated component, to provide a fluid tight envelope which will allow relative movement therebetween. The axial load may be provided with one or more compression springs. With this form of construction there is no problem in matching the spring means to provide the necessary loading on the sealing faces.

The present invention is however concerned with seals in which the secondary sealing means and spring means are provided by a single component, for example, an elastomeric bush or resilient bellows unit. With this form of construction, the characteristics of the secondary sealing/spring means must be a compromise between the strength required to oppose the pressure differential that may be applied across said means and the spring rate required to provide the required loading between the sealing faces. As a result, with this form of seal, the axial loading on the seal face member may be too great, particularly under start up conditions, when the pressure of fluid is insufficient to build up an adequate lubricating film between the sealing faces.

A short term overload situation may be relieved by the use of low friction materials for the seat and seal face member. However such materials, for example carbon, are normally relatively weak compared with other materials that may be used to form the sealing elements, for example refractory materials, and also they are not suitable for all applications.

The sensitivity of the seal to overloading may also be decreased by increasing the width of the sealing faces. However, if the faces are made too wide, problems arise from overheating, which may result in thermal distortion and disruption of the lubricating film. Attempts have been made to overcome this by partially cutting away the seal face member to encourage coolant penetration and film formation. However such designs have a tendency to deflection, distortion or wear that can result in the face load being carried on the well lubricated interrupted areas of the seal face member, thus causing the continuous sealing track to open and the seal to leak. Also in some mechanical seal designs, particularly those for large diameter shafts, the sealing elements are designed in such a way that they are capable of distortion when subjected to a pressure differential, so as to ensure a desirable contact and fluid film pattern. Unfortunately, in order to achieve the necessary distortion, the width of the sealing faces must be limited, as a result of which the face load is relatively high and sensitive to overloads. Furthermore, this form of seal is unsuitable for use with some fluids, which are not able to penetrate between the sealing faces and form a fluid film, at the high face loading.

According to one aspect of the present invention a mechanical face seal for producing a fluid tight seal between a pair of relatively rotatable components comprises, a first sealing element associated with one of said components and fixed axially with respect to the component, a second sealing element associated with the other component and movable axially with respect to the component, means for sealing the second sealing element with respect to its associated component and loading it axially into sealing engagement with the first sealing element, and a thrust bearing arranged in parallel with said first and second sealing elements to partially reduce the load applied to the sealing elements.

In the arrangement described above, the thrust bearing reduces the face loading and hence the sensitivity of the seal to overloading. Also, as the sealing elements are independent of the thrust bearing, the sealing face may be arranged to distort and provide a desirable contact and lubricating film pattern, without any of the disadvantages of the designs used hitherto.

Several embodiments of the invention are now described, by way of example only, with reference to the accompanying drawings, in which:

FIG. 1 shows a sectional side elevation of a mechanical seal formed in accordance with the present invention;

FIG. 2 shows a sectional view along the line II—II in FIG. 1;

FIG. 3 illustrates in part elevation a modified version of the thrust bearing used in the seal illustrated in FIG. 1; and FIG. 4 illustrates an alternative form of seal formed in accordance with the present invention.

The seal illustrated in FIG. 1 is mounted between a shaft 10 and housing 11, to provide a fluid tight seal where the shaft 10 passes through the wall of the housing 11. An annular seat 12 is secured to the housing 11 by means of a series of annularly spaced bolts 13, so that it surrounds the shaft 10 as it passes through the housing 11.

A rubber bush unit 15 is mounted about the shaft 10 and is clamped thereto by a driving clamp 16, which is formed in two halves and clamped together about the shaft 10 and end of the bush 15, by a pair of tangential bolts. An annular seal face member 17 is mounted at the free end of the rubber bush 15. The rubber bush 15 is clamped to the shaft 10 at a position spaced axially from the seat 12, such that when the opposed surfaces of the seat 12 and the seal face member 17 are in sealing engagement, the rubber bush 15 is under axial compression and applies an axial load to the seal face member 17.

The free end of the rubber bush 15 is counter-bored so that it is spaced radially from the shaft 10. A bearing ring 18 is mounted coaxially of the seal face member 17 on the free end of the bush 15, a spigot portion 19 on ring 18 engaging in the counter-bore of the bush 15.

The ring 18 is provided with a castellated end 20 which engages the seat 12. The ring 18 is dimensioned so that it extends slightly further forward from the bush 15 than the seal face member 17. The portion of the bush 15 abutting the ring 18 is consequently under greater compression than the portion abutted by the seal face member 17 and the ring 18 will thereby be resiliently loaded towards the seat 12 relative to the seal face member 17.

The ring 18 may consequently be arranged to carry a proportion of a load applied by the bush 15. The proportion of the load carried by ring 18 may be varied depending on the degree of compression of the bush 15.

The ring 18 is spaced radially within the seal face member 17 and a recess 21 is also provided in the ring 18, so that it will not interfere with distortion or twisting of the seal face member 17. The seal face member 17 may consequently be arranged to distort or twist in response to the pressure differential across the seal, so that the fluid film between the seal face member 17 and seat 12 may be adjusted to suit the prevailing conditions.

The castellations in the face 20 of the ring 18 which engages the seat 12, allow circulation of fluid around the seal face member 17, so that a fluid film may be formed between the sealing faces of the seal face member 17 and seat 12 and these faces may be cooled. The castellations also encourage lubrication of the face 20 of the ring 18 where it engages the seat 12.

The shape of the castellations on face 20 may be modified by cambering their wearing surfaces so as to further improve lubrication of these surfaces, as illustrated in FIG. 3. Alternatively other means, for example grooves may be provided in the face 20 to encourage the formation of a lubricating fluid film between face 20 and the seat 12.

In the embodiment illustrated in FIG. 4, the seal face member 17 is mounted on a carrier ring 25. The carrier ring is mounted upon shaft 10 by means of, for example, a flexible resilient metal bellows unit 26 which will provide a fluid tight joint between the carrier ring 25 and shaft 10 and also urge the seal face member 17 axially into sealing engagement with the seat 12. A thrust ball or roller-bearing arrangement 27 is mounted resiliently between seat 12 and carrier ring 25 on a plurality of angularly spaced compression springs 28 mounted in recesses 29 in the carrier ring 25. This thrust ball or roller-bearing arrangement 27 will act in a similar manner to the bearing ring 18 in the embodiment described with reference to FIG. 1 to reduce the face-loading between the seal face member 18 and seat 12. As an alternative to compression springs 28 in the above embodiment, a rubber insert under compression may be provided between the carrier ring 25 and bearing assembly 27.

Various modifications may be made without departing from the invention. For example, in the above embodiments the thrust bearing has been positioned internally of the seal face member, so that the sealed fluid may be used to lubricate and cool both the sealing faces and the thrust bearing. The thrust bearing may however be positioned externally of the seal face member where, for example, the sealed fluid is external of the seal face member or a separate fluid source is provided for lubrication and cooling of the thrust bearing.

I claim:

1. A mechanical face seal for producing a fluid tight seal between a pair of relatively rotatable components comprising a first sealing element associated with one of said components and fixed axially with respect to the component, a second sealing element associated with the other component and movable axially with respect to the component, means for sealing the second sealing element with respect to its associated component and loading it axially into sealing engagement with the first sealing element, and a thrust bearing arranged in parallel with the first and second sealing elements to partially reduce the load applied to the sealing elements.

2. A mechanical face seal according to claim 1, in which the means for sealing the second sealing element with respect to its associated component and loading it axially into sealing engagement with the first sealing element is an elastomeric bush unit.

3. A mechanical face seal according to claim 2, in which the thrust bearing is provided by a ring, which is mounted coaxially of the second sealing element in the end of the bush unit, said ring being separated radially from the second sealing element, but aligned axially with the sealing face of the first sealing element.

4. A mechanical face seal according to claim 3, in which the face of the ring opposed to the sealing face of the first sealing element is provided with means to encourage the formation of a lubricating film.

5. A mechanical face seal according to claim 4, in which the ring is castellated.

6. A mechanical face seal according to claim 5, in which the surfaces of the castellations which engage the first sealing element are cambered.

7. A mechanical face seal according to claim 1, in which the means for sealing the second sealing element with respect to its associated component and loading it axially into sealing engagement with the first sealing element is provided by a resilient bellows unit, said bellows unit being connected between the component and a carrier ring on which is mounted the second sealing element, a thrust bearing being mounted on the carrier ring coaxial with the second sealing element with spring means interposed between the thrust bearing and the carrier ring.

8. A mechanical face seal according to claim 7, in which the said spring means comprises one or more compression springs.

9. A mechanical face seal according to claim 7, in which said spring means comprises an elastomeric insert.

10. A mechanical face seal according to claim 1, in which the thrust bearing is in the form of a ball or roller bearing.

* * * * *